No. 841,387. PATENTED JAN. 15, 1907.
L. DE FOREST.
DEVICE FOR AMPLIFYING FEEBLE ELECTRICAL CURRENTS.
APPLICATION FILED OCT. 25, 1906.

2 SHEETS—SHEET 1.

WITNESSES:
E. B. Tomlinson
Patrick J. Conroy

INVENTOR:
Lee de Forest
by Geo. K. Woodworth
Attorney.

UNITED STATES PATENT OFFICE.

LEE DE FOREST, OF NEW YORK, N. Y.

DEVICE FOR AMPLIFYING FEEBLE ELECTRICAL CURRENTS.

No. 841,387.     Specification of Letters Patent.     Patented Jan. 15, 1907.

Application filed October 25, 1906. Serial No. 340,467.

*To all whom it may concern:*

Be it known that I, LEE DE FOREST, a citizen of the United States, and a resident of New York, in the county of New York and State of New York, have invented a new and useful Improvement in Devices for Amplifying Feeble Electrical Currents, of which the following is a specification.

My invention relates to devices for amplifying feeble electrical currents—such, for example, as telephone-currents; and its object is to produce an amplifying device of greater efficiency and simplicity than those heretofore employed.

My invention will be described with reference to the drawings accompanying and forming a part of this specification, and in which—

Figures 1, 2, 3, 4, 5, 6, and 7 represent conventionally or diagrammatically various arrangements of apparatus and circuits whereby my invention may be carried into effect.

In the figures, A represents an evacuated vessel inclosing a sensitive conducting gaseous medium maintained in a condition of molecular activity.

R is a signal-indicating device.

B B are batteries or other sources of electrical energy.

D E D' are electrodes sealed within the receptacle A.

The circuit B R D E is a local receiving-circuit. The circuit F is a line-circuit conveying the currents to be amplified to the amplifying device. The electrode E, which may be of platinum, tantalum, carbon, or other suitable material, is heated and preferably maintained incandescent by the battery B'. The electrodes D and D, which may be plates of platinum or other suitable material, are placed in close proximity to the electrode E, and when the electrode D' is employed its separation from the electrode E preferably is less than that of the electrode D therefrom.

Figure 1:
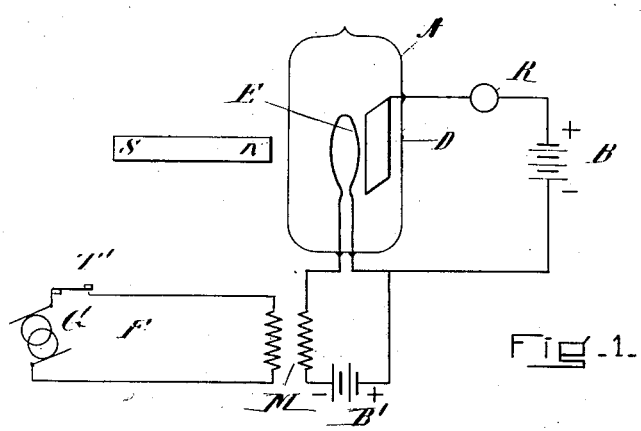

In Fig. 1, N S represent a magnet placed adjacent to the vessel A. The currents to be amplified may be impressed upon the circuit which includes the heated electrode or filament E—as, for example, by means of the transformer M—and the magnetic field set up by these currents reacts upon the field set up by the magnet N S, thereby causing a slight variation in the separation between the electrodes D E. I have found that the slightest variation in the separation of the hot and cold electrodes produces a large and disproportionately greater variation in the flux between said electrodes, especially if the latter are close together, and such variation in flux may be made manifest by the signal-indicating device R.

Figure 2:
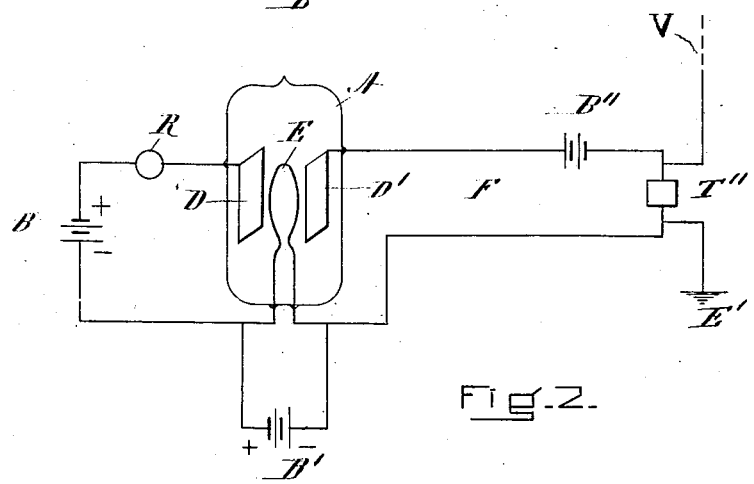

In Fig. 2 the current to be amplified may be impressed upon the medium intervening between the electrodes D and E, and thereby alter, by electrostatic attraction, the separation between the electrodes. In this case D' may be a strip of platinum-foil, and the slightest approach thereof toward the filament will act to slightly cool the gaseous medium, and thereby alter the current in the local circuit, or, if D' is rigid, the increase in electrostatic attraction between D' and E will cause E to recede from D, and thereby alter the current in the local circuit.

Figure 3:
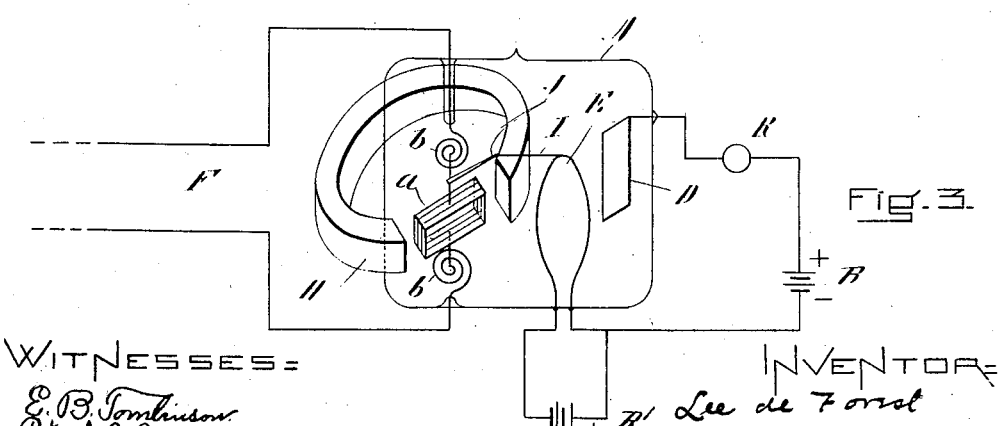

In Fig. 3 the filament E is connected, by means of a minute platinum wire I, to the arm J which is secured to the coil a, placed between the poles of the magnet H and secured to the walls of the vessel A through the spiral springs b b. The line-current to be amplified in this case is passed through the coil a through the springs b b, and the resulting rotation of the coil varies the separation between the electrodes D E, thereby altering the current in the local circuit.

Figure 4:
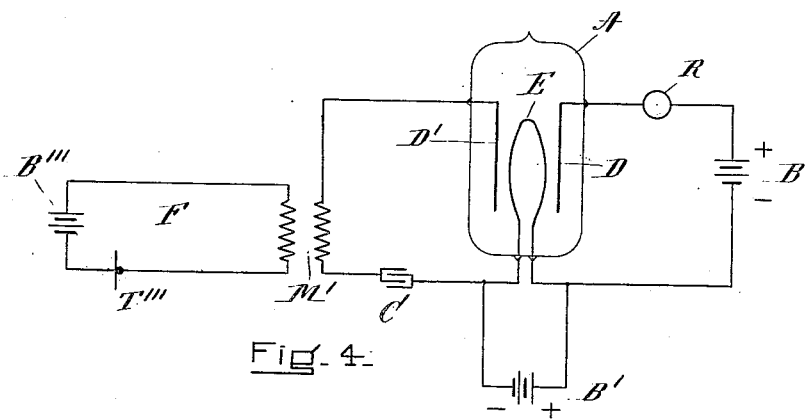

In Fig. 4 the currents to be amplified may be impressed upon the gaseous medium intervening between D' and E by means of the transformer M'. A condenser C may be included in series with the secondary of said transformer and the electrodes D' E. In this case there may or may not be a variation between the separation of the electrodes, and the currents to be amplified may vary the motions of the ions around the filament, thereby controlling to a greater degree the flux between said filament and the electrode D.

Figure 5:
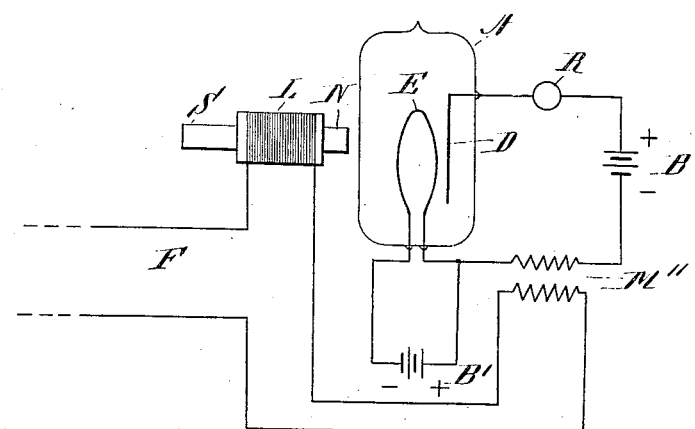

In Fig. 5 the currents to be amplified may be passed through the solenoid surrounding the magnet N S, and thereby vary the field, which by coacting with the magnetic field surrounding the electrode E determines the normal separation of the electrodes D and E. Even without creating actual movements between the electrodes D and E the varying magnetic flux produced by the line-current passing through the solenoid L will affect the motion of the ions in the gaseous medium, and thereby alter the current in the local circuit.

Figure 6:
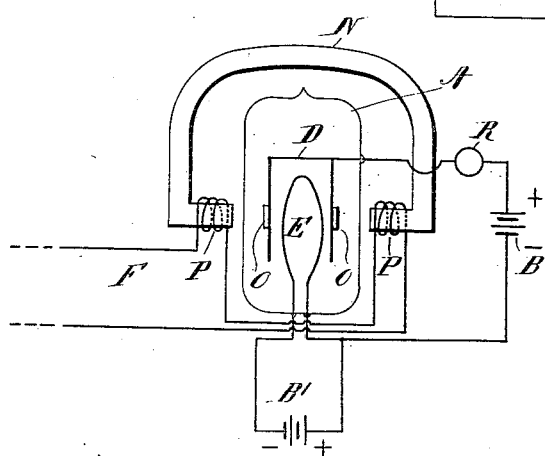

In Fig. 6 the electrode D may be constituted of iron or may consist of platinum plates provided with small iron armatures O O. In either case the currents to be amplified by passing through the solenoids P P, which surround the poles of the magnet N, effect the desired variation in the separation of the electrodes D and E.

Figure 7:
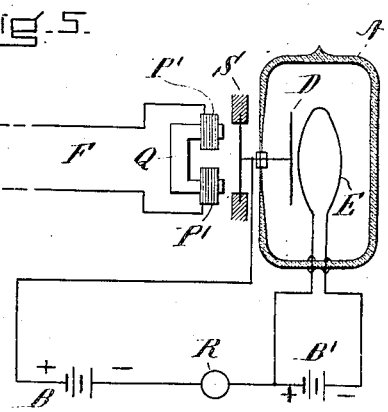

In Fig. 7 the electrode D and diaphragm S may both be rigidly secured to the inside and outside, respectively, of the glass wall of the vessel A at a point where said wall has been flattened and made very thin, like the crystal of a watch. The currents to be amplified in this case by operating upon the coils P' P', surrounding the magnet Q, effect slight movements of the diaphragm S, and these movements are mechanically transmitted through the glass wall of the vessel A to the electrode D, thereby varying the current in the local receiving-circuit.

It will be obvious that the amplifying device, which constitutes the subject-matter of the present invention, is not limited in its use to any particular kind of electrical circuit or apparatus, but that it is capable of general application wherever an amplifying device is required. By way of example of its application to a wire telegraph or cable system I have shown the line F in Fig. 1 as including a telegraph transmitting-key T' and source of vibratory current G. In Fig. 2 I have shown the line F as constituting the local circuit of a wireless-telegraph receiving system including the battery B'' and oscillation-detector T'', the latter being connected in series with an antenna V and the earth E'. In Fig. 4 I have shown the line F as constituting a telephone-circuit including the microphone-transmitter T''' and battery B'''. In all instances it will be understood by those skilled in the art and without going into further detail that the signal-indicating device R, which is included in the local receiving-circuit, may be any device suitable for the purpose of reproducing the signal initiated in the line F I do not limit myself to any of the specific embodiments of my invention herein described, inasmuch as many modifications will readily occur to those skilled in the art without departing from the principle of my invention.

I claim—

1. In a device for amplifying electrical currents, an evacuated vessel inclosing a sensitive conducting gaseous medium maintained in a condition of molecular activity, two electrodes sealed within said vessel, a local receiving-circuit associated with said electrodes, and means whereby the separation of said electrodes may be varied by the currents to be amplified.

2. In a device for amplifying electrical currents, an evacuated vessel, two electrodes sealed within said vessel, means for heating one of said electrodes, a local receiving-circuit associated with said electrodes, and means whereby the separation of said electrodes may be varied by the currents to be amplified.

3. In a device for amplifying electrical currents, an evacuated vessel, two electrodes sealed within said vessel, a circuit including a source of electric energy connected in series with one of said electrodes, a local receiving-circuit associated with said electrodes, and means whereby the separation of said electrodes may be varied by the currents to be amplified.

4. In a device for amplifying electrical currents, an evacuated vessel, three electrodes sealed within said vessel, means for heating one of said electrodes, a local receiving-circuit including two of said electrodes, and means for passing the current to be amplified between one of the electrodes which is included in the receiving-circuit and the third electrode.

5. In a device for amplifying electrical currents, an evacuated vessel inclosing a gaseous medium, means other than the received energy for maintaining said gaseous medium in a condition of molecular activity, means for impressing the currents to be amplified upon said gaseous medium, and a local receiving-circuit having its electrodes sealed within said vessel.

6. In a device for amplifying electrical currents, an evacuated vessel, a heated electrode and two non-heated electrodes sealed within said vessel, the non-heated electrodes being unequally spaced with respect to said heated electrode, a local receiving-circuit including said heated electrode and that one of the non-heated electrodes which has the greater separation from the heated electrode, and means for passing the current to be amplified between the heated electrode and the other non-heated electrode.

In testimony whereof I have hereunto subscribed my name this 17th day of October, 1906.

LEE DE FOREST.

Witnesses:
 RALPH POLK BUELL,
 SIDNEY WILLIAMS